Feb. 9, 1971  N. V. REINFELD  3,561,908
GOLF BALL TRIMMING APPARATUS
Filed April 10, 1968  4 Sheets-Sheet 1

INVENTOR.
NYLES V. REINFELD
BY
Oldham & Oldham
ATTORNEYS.

INVENTOR.
NYLES V. REINFELD
BY
Oldham & Oldham
ATTORNEYS.

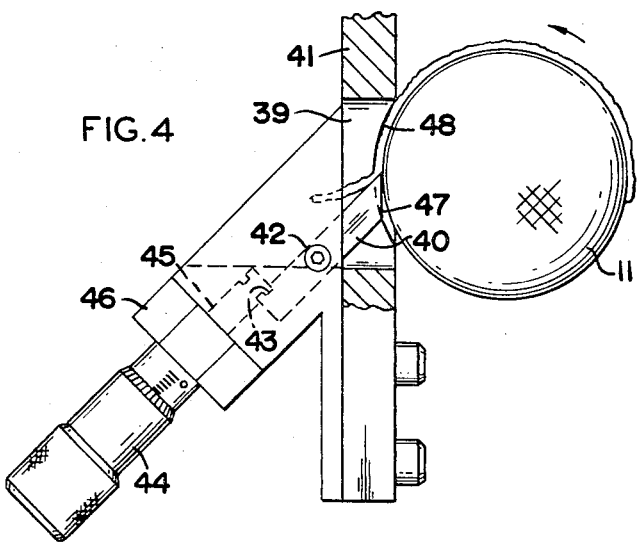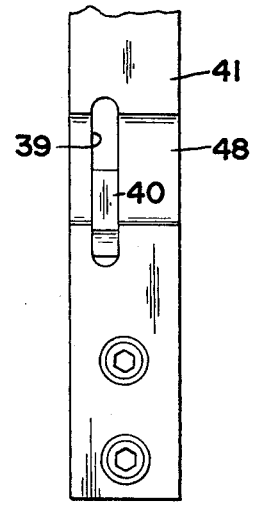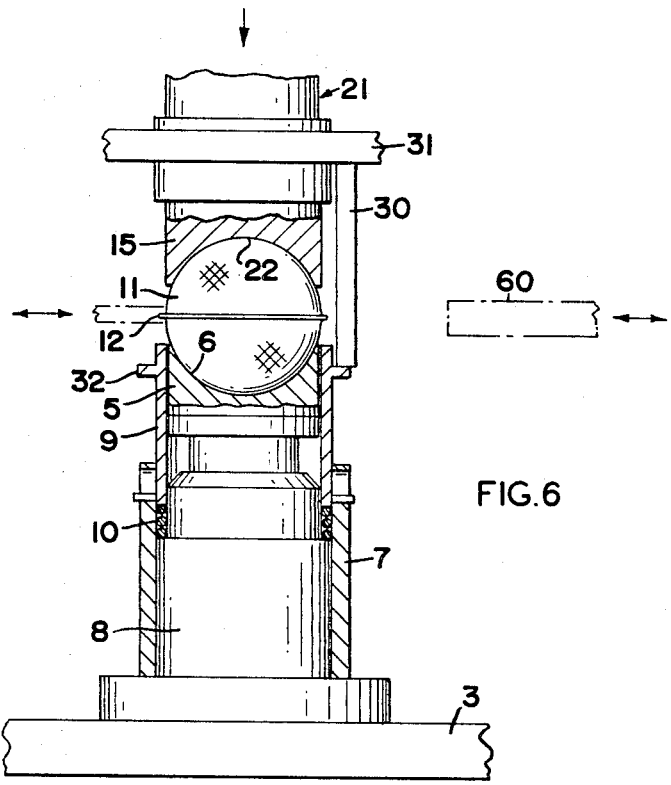

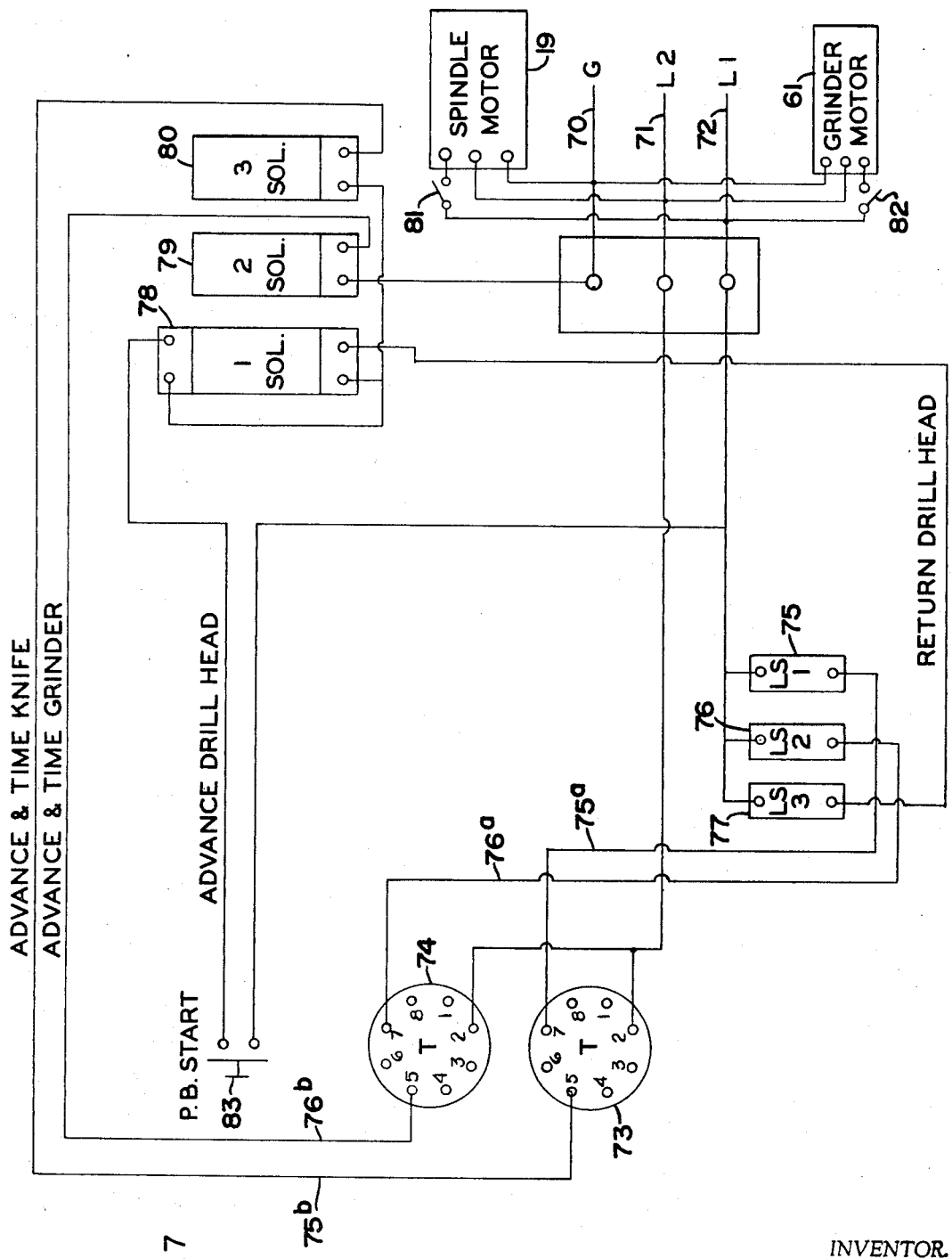

United States Patent Office 3,561,908
Patented Feb. 9, 1971

3,561,908
GOLF BALL TRIMMING APPARATUS
Nyles V. Reinfeld, 610 Treeside Ave.,
Akron, Ohio 44313
Filed Apr. 10, 1968, Ser. No. 720,020
Int. Cl. B24b 7/04
U.S. Cl. 51—5       11 Claims

ABSTRACT OF THE DISCLOSURE

This apparatus includes a rotatable ball support member, a rotatable ball engaging member positionable directly above the ball support member and means for driving the ball engaging member. Other means position the ball engaging member for movement to and from engagement with the ball on the ball support member, a cutter means is provided and a support means carries the cutter means and is pivotally positioned so that control means connecting to the support means can move it to bring the cutter means into and out of engagement with the ball on the ball support member for trimming mold flash, or rind therefrom.

---

The present invention particularly relates to apparatus for trimming mold flash from balls, particularly golf balls, as when such as balls are produced, normally they are made in a two-part mold that leaves a mold rind or flash protruding therefrom at a diametric plane portiton of the ball.

Heretofore it has been quite difficult to trim this mold flash or rind effectively as these balls must be made very accurately to size and weight requirements. Also, a large number of balls must be trimmed rapidly, and efficiently, at low cost if a commercial trimming operation is to be obtained.

The general object of the present invention is to provide a novel and improved apparatus for trimming golf balls and the like and characterized by the provision of a very accurately positionable cutter means which is adapted to be brought into resilient engagement with a positioned golf ball for gradually and progressively trimming the mold flash therefrom.

Another object of the invention is to provide apparatus which will operate substantially automatically and will move through a patterned or programmed cycle for effectively engaging a ball, progressively cutting the mold flash therefrom, buffing the trimmed ball, if necessary, and moving a new ball into operative position in the apparatus.

Another object of the invention is to provide an effective member for readily engaging and properly positioning an untrimmed golf ball by engaging the mold rind thereon and then to deposit the ball automatically into a proper ball engaging member for trimming action as a means is brought into engagement with the ball for rotating it for trimming action.

Another object of the invention is to provide golf ball trimming apparatus wherein a cutter means is positioned in resilient relationship with an untrimmed ball to be progressively biased into engagement with the ball as it is rotated on an axis perpendicular to the rind of the ball for trimming purposes.

The foregoing and other objects and advantages of the invention will be made more apparent as the specification proceeds.

Attention now is particularly directed to the accompanying drawings wherein:

FIG. 4 is an enlarged fragmentary plan, partially broken away and shown in horizontal section, of the specific golf ball trimming means of FIG. 3, shown in engagement with a golf ball;

FIG. 5 is a right hand side elevation of the trimmer means of FIG. 4;

FIG. 6 is an enlarged elevation, partially broken away and shown in vertical section, of the golf ball positioning means in the apparatus of the invention; and FIG. 7 is a schematic wiring diagram of the control circuit.

When referring to corresponding members shown in the specification and referred to in the drawings, corresponding numerals are used to facilitate comparison therebetween.

Figure 1:
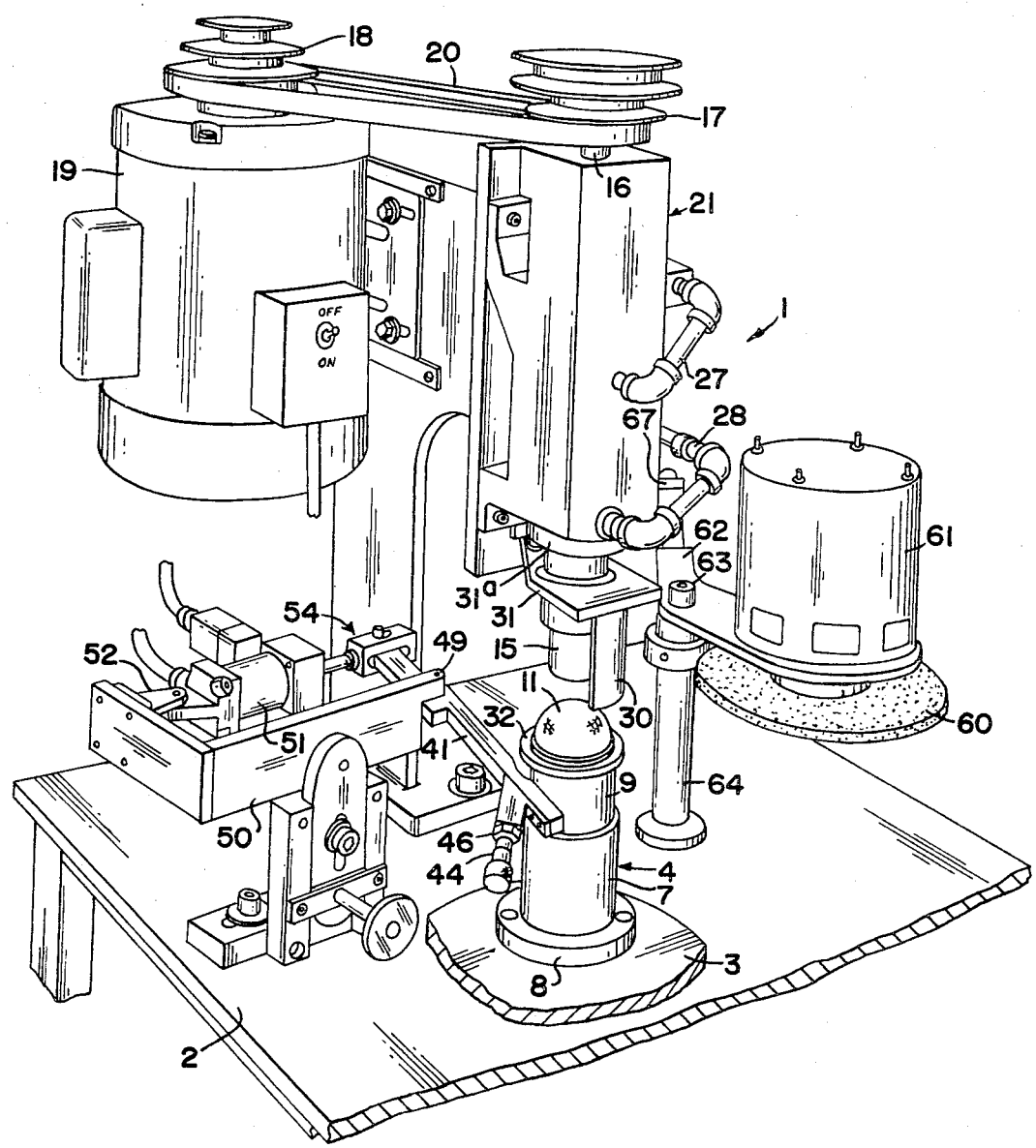
FIG. 1 is a perspective view of golf ball trimming apparatus, with portions of the apparatus broken away and eliminated for clarity and shown in vertical section, which apparatus embodies the principles of the invention.
Figure 2:
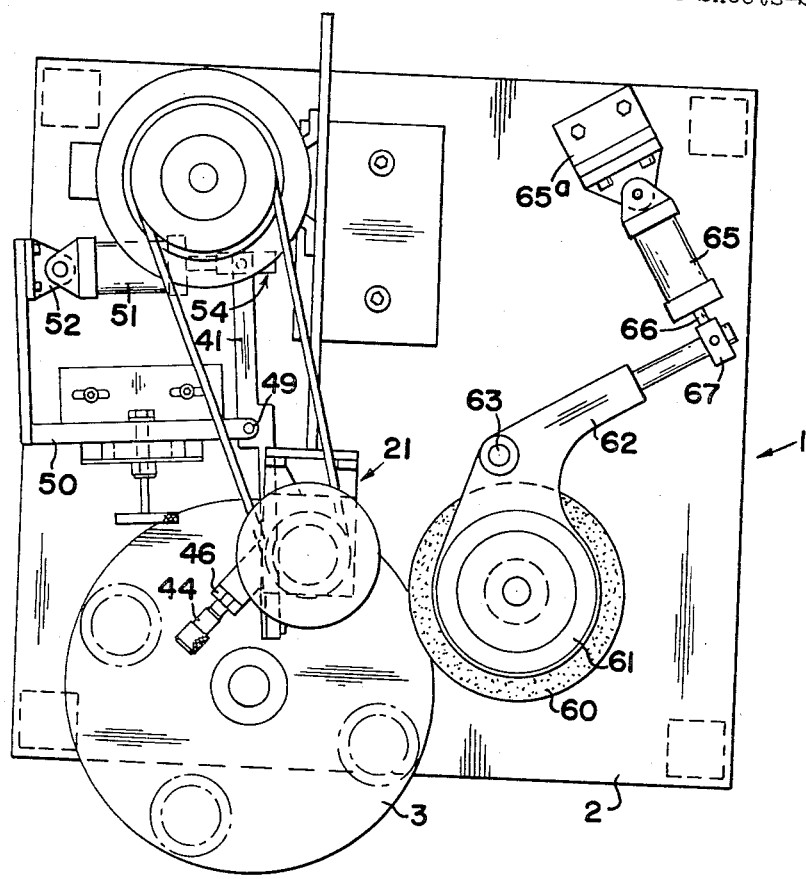
FIG. 2 is a plan view of the apparatus of FIG. 1.

With reference to the details of the apparatus shown in the accompanying drawings, a golf ball trimming apparatus or the like is indicated as a whole by the numeral 1. This apparatus 1 includes any suitable type of a frame 2. If desired, any suitable type of turntable 3 can be suitably journalled on the frame 2, and such turntable or turret can be of any suitable size and have a plurality of peripherally spaced golf ball support members indicated as a whole by the numeral 4 provided on peripheral portions thereof. Any suitable means, not shown, can be provided for moving the turret or turntable 3 through indexed steps of arcuate movement whereby one of the golf ball support members 4 will be accurately located in association with the rest of the apparatus at any desired time. Each of the golf ball supporting members 4 includes a support 5 that has a concave recess 6 in its upper end. The golf ball supporting members 4 are all positioned on vertical axes and the recess 6 is of a semispherical size and shape to engage with less than half of the ball to be trimmed in the apparatus 1.

So as to position a ball for trimming action, the support 5 is engaged by suitable means, such as a sleeve 7 and a base 8 with the support 5 being suitably journalled in or by means associated with the sleeve 7 and/or base 8, and whereby such means, such as bearings, provide for low friction rotation of the support 5 when any turning force is applied thereto.

In order to facilitate the positioning of balls in the recess 5, FIG. 6 shows that a sleeve 9 is provided in telescopic engagement with the support 5 and such sleeve 9 has resilient means, such as a spring 10, engaging the sleeve and normally positioning its upper end above the upper end of the support 5. The sleeve 9 is of such size that it engages the rind of an untrimmed golf ball 11, which can be dropped down onto or placed on the upper end of the sleeve 9, and which ball will then automatically seat itself with the rind 12 of the ball engaging the upper end of the sleeve 9. When the sleeve 9 is moved downwardly, the ball 11 is so positioned that it will automatically seal in the recess 6 of the support 5 with the rind 12 being in a horizontal plane, as shown in FIG. 6.

In order to drive the ball 11 positioned on a golf ball support member 4 for trimming action thereof, a rotatable ball engaging member 15 is positioned in the apparatus 1 above the golf ball support member 4 as indexed or positioned in the apparatus for trimming action. The ball engaging member 15 is connected by conventional means to a drive shaft 16 that has a drive pulley 17 provided thereon. An output pulley 18 of a motor 19 connects by a V-belt 20 or the like to the pulley 1 for rotating the ball engaging member 15 whenever the motor is energized.

Such member 15 is formed as a part of or secured to the driven output shaft of a conventional unit 21, such as a Bellows Locke Drilling Unit Model B1111–004 of Bellows-Valvair Co. of Akron, Ohio. Such ball engaging member 15 can be driven at all times and can be moved vertically on its vertical axis by the unit 21 so that the lower end of the ball engaging member, which has a concave, semi-spherical recess 22 formed in its lower end can be moved to engage the ball 11. The recess 22 is adapted to engage with less than half of the periphery of an untrimmed ball 11, so that the ball engaging member, when moved into engagement with the ball 11, will rotate it rapidly and will clamp it to and rotate the ball support 5. Compressed fluid, such as air, is supplied to a double acting cylinder within the unit 21 by supply lines 27 and 28 whereby the ball engaging member 15 is moved into engagement with the ball 11 for rapid rotation thereof.

So as to depress the sleeve 9 and drop the ball onto the support 5, an extension arm 30 is carried by a bracket 31 operatively associated with the unit 21 and ball engaging member 15 but secured to an outer sleeve 31a of the unit which outer sleeve 31a is reciprocably but non-rotatably positioned in the apparatus. Such arm 30, upon downward movement of the ball engaging member 15, engages a flange 32 secured to, or provided on the ball support sleeve 9 adjacent the upper end thereof whereby such sleeve will be depressed and moved downwardly to lower the ball onto its support 5 for trimming action. At the same time, the sleeve 9 is moved out of association with the ball 11 to expose the rind 12 thereof for trimming action.

A cutter means, such as a knife 40, is adjustably carried by a support means, such as a bar or arm 41, by means such as a set screw 42 engageable with the knife 40. The knife 40 is received in a longitudinally extending slot 39 formed in the support arm 41. Such knife preferably has a recess or slot 43 in an end portion thereof and a control member, such as a micrometer 44, is provided and it has its shaft 45 operatively engaged with the slot 43 by an annular end rib. Hence, relative rotary movement between the shaft 45 and the knife is permitted, but such movement will move the knife longitudinally of the support arm 41 by loosening the set screw. The micrometer 44 is carried by a member, such as a bracket 46, secured to and extending from the support arm. The longitudinal axis of the cutter bar or knife is set at an angle of approximately 45° with relation to a tangent of the ball 11 as positioned in the apparatus for trimming action. The end face or surface 47 of the knife 40 is beveled at an angle of 45° to the longitudinal axis of the knife for good trimming engagement therewith, but to avoid damaging the ball. It should be noted that the face or surface 47 is tangent to the ball. Preferably the support arm 41 has a concave recess 48 provided in an edge face thereof which recess is contoured for smooth engagement with a peripheral portion of the ball 11 and adapted to engage therewith, particularly when all or substantially all of the rind or flash 12 has been trimmed from the ball.

Figure 3:
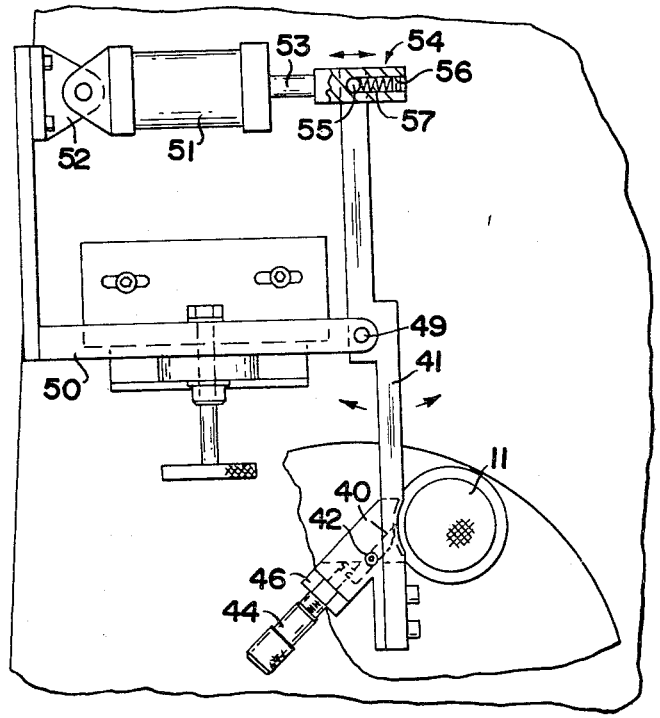
FIG. 3 is a fragmentary enlarged plan view, partially broken away and shown in horizontal section, of the golf ball trimming means and support therefor.

The support arm 41 is pivotally positioned on the frame 2, as by a pin 49 or equivalent means that engages a bracket or support 50 which bracket is suitably secured to the frame 2. A suitable control means, such as a double acting air actuated cylinder 51, is suitably pivotally secured to the frame 2, as by a bracket and pin means 52, and such cylinder has compressed air or other fluid supply thereto by two conduits or tubes whereby the cylinder is double acting and it has a piston rod 53 that operatively engages an end of the support arm 41 remote from the knife 40 by a connector means 54. This connector means 54, as best shown in FIG. 3, includes a pin 55 that extends vertically of the connector means 54 and extends through a longitudinally extending slot 56 provided in the connector means or block. A coil spring 57, or similar means, is provided in the connector means to urge the pin 55 toward the cylinder 51 at all times, and this in turn resiliently biases the cutter means towards the golf ball. However, if any resistance to action of the cutter means or member occurs, the support arm is free to move radially away from the ball 11 against the action of the spring 57. Hence, the cutter arm will progressively be moved into engagement with the peripheral portion of the ball as the rind is progressively trimmed from the ball depending upon the protrusion of the knife 40 from the recess 48 and such rind will be progressively but rapidly cut off the ball and be discharged out the slot 39.

It will be realized that the ball engaging member 15 is rotated at a relatively high rate of speed so that the ball 11 will be trimmed in a very short time, such as two or three seconds at most, as the cutter or knife 40 is resiliently urged into engagement with the peripheral portion of the ball in the horizontal plane thereof having the mold flash or rind thereon.

The apparatus can be set up with any suitable automatic controls whereby the ball engaging member 15 will only be urged to its lowermost position for a few seconds, such as up to four or five seconds, at most, after which time the ball engaging member will be automatically retracted to its uppermost position. The same controls can be utilized to actuate a grinder or buffing disc 60 which may be provided in the apparatus. This grinder disc 60 is positioned in a horizontal plane, preferably, in the apparatus of the invention to be brought into engagement with the ball, and such action preferably occurs while the ball engaging member 15 still is in operative engagement with the ball to insure high speed rotation thereof. The disk 60 is suitably secured to the output shaft of a motor 61 that has any desired power supply and control means connected thereto. The entire motor 61 and disc 60 assembly is carried on a lever arm 62 which is fulcrumed at 63 on a suitable support 64 secured to the frame. The lever arm 62 has conventional control means, such as a double acting power cylinder 65, connected thereto by a piston rod 66, engaging an arm of the lever 62 or a member operatively secured thereto. The cylinder 65 is pivotally secured to a bracket 65a secured to the frame 2. Any suitable connector means 67 secures the piston rod 66 to the lever 62 whereby when the cylinder 65 is energized, an edge of the disc 60 can be brought into light operative buffing engagement with the ball 11 for cleaning off any part of the rind 12 still remaining on the ball after the trimming action heretofore performed.

As previously indicated, the apparatus of the invention may or may not include a suitable turntable or turret 3, as desired. In all events, a worker or other means will position an untrimmed ball on the sleeve 9, and then if a turnable action is in effect, the turntable would be progressively indexed until the various ball support members would be individually brought into the operative indexed position for ball trimming action. Thereafter, the trimmed ball would be moved with the turret as it is progressively indexed through a cycle, and the worker would, usually, manually remove a trimmed ball and position another untrimmed ball in the ball support sleeve, with the ball automatically centering itself in such sleeve for further action in the apparatus of the invention. FIG. 7 shows a schematic wiring diagram for a single station electrical control unit for a single station ball trimming apparatus. In this instance, power is supplied by leads 70, 71 and 72 with the power lead 71 being connected to appropriate terminals of timers 73 and 74. These timers are of conventional design and may be models CD–21 made by the Automatic Timing and Controls, Inc., of King of Prussia, Pa.

The power lead 72 connects to one terminal of limit switches numbers 75, 76 and 77, with the switches 75 and 76 connecting to terminals of the timers 73 and 74 by leads 75a and 76a respectively. Three control solenoids numbers 78, 79 and 80 are also provided in the control circuit. The solenoids 79 and 80 received power impulses thereto from the respective control timers 73 and 74 connected thereto by leads 75b and 76b as shown. The spindle motor 19 is connected to all power leads and has a control switch 81 in its circuit so that the spindle motor operates at all times when the switch 81 is closed. Likewise, the grinder motor 61 is connected to all power leads and has a control switch 82 in its circuit so that the grinder runs at all times when such switch is closed.

In order to advance the drill head carrying the golf ball engaging member 15, a push button switch 83 is provided in the power circuit for the solenoid 78. Thus the apparatus is so set up and interlocked to operate so that the solenoid 78, on an impulse being provided therefor through the push button control switch 83, will move the drill head downwardly by the unit 21. At that time, the limit switch 75, which is normally held closed by the drill head when in its inoperative position, is opened and this gives a signal to the timer 73 to energize it. The timer energizes the solenoid 80 to bring the knife into operative engagement with a ball positioned on the member 5 for ball trimming action. When this timer 73 runs through an operative cycle, it energizes the other terminal of the solenoid 80 to return the knife positioning means to inoperative position. At such time, the knife positioning means hits the limit switch 76, which is a normally open switch, to close such a switch. The switch 76, when closed, gives a signal to the timer 74 to start it on its operative cycle and to advance the grinder disc 60 into operative engagement with the ball by an impulse to one side of the solenoid 79. When this timer 74 completes its cycle, it sends an impulse to the other side of the solenoid 79 to move the grinder back to inoperative position. Such movement causes LS-3 to be momentarily closed, as it is a normally open switch, to provide an impulse back to one side of the solenoid 78, to return the drill head to inoperative position and thus complete an operative cycle in the apparatus of the invention.

It should be realized that the turntable 3 can be moved manually, or by automatic means from one operative position to another to position balls in the apparatus for flash trimming action. Actually, if the machine is to be more complex and have automatic operation, other means can be added to the circuit shown in FIG. 7 to provide for automatic movement of the turntable 3 and, if desired, to provide automatic starting impulses, as provided by the push button 83 in the single station shown, so that the apparatus will function through an automatic trimming cycle each time a new ball is moved into an operative position by an indexed action of the turntable 3.

Obviously the timers 73 and 74 are controllable so that by just adjusting a control knob or equivalent means on the timer, the operative length of trimming and/or grinding cycles can be readily and accurately controlled to provide fractions of a second up to two or three or more seconds as is desired for the individual trimming or grinding action.

The conventional unit 21 has the extension arm 3c secured thereto for reciprocation only by attachment to a reciprocable portion thereof. Of course, such arm 30 is of a size and is so positioned that it doesn't interfere with the grinder disc 60 or other means in the apparatus. Use of the sleeve 9 provides an automatic leveling or positioning of an untrimmed ball for trim action.

From the foregoing, it is believed that a novel and improved ball trimming apparatus has been provided and this apparatus will function with a minimum of labor used in association therewith.

While one complete embodiment of the invention has been disclosed herein, it will be appreciated that modification of this particular embodiment of the invention may be resorted to without departing from the scope of the invention as defined in the appended claims.

What is claimed is:

1. Apparatus for trimming golf balls, or the like and including:
    a frame,
    a vertically positioned rotatable ball support member having a ball receiving means at its upper end for engaging less than half of a ball positioned thereon,
    a rotatable ball engaging member positionable by said frame directly above said ball support member and having a concave lower end to engage less than half of a ball on said support member,
    means for driving said ball engaging member,
    means for moving said ball engaging member to and from engagement with a ball on said ball support member,
    a cutter means,
    a support means for said cutter means pivotally carried by said frame for movement of said cutter means in a horizontal plane for engaging only a mid-portion of a ball, and
    control means on said frame operatively connecting to said support means to move said support means to bring said cutter means into and out of engagement with a ball on said ball support member.

2. Apparatus as in claim 1 further comprising:
    connector means connecting said control means operatively to said support means and including a spring engaging said support means to urge said cutter means into engagement with a said ball to cut the mold ring therefrom.

3. Apparatus as in claim 1 further comprising:
    a driven grinder disc is operably positioned on said frame, and
    means engage and control said grinder disc to move it into engagement with a ball on said ball support member after the engagement of said cutter means therewith.

4. Apparatus as in claim 1 and further comprising said ball support member having a concave support recess that engages less than half of a positioned ball,
    a vertically positioned ball engaging sleeve telescopically engages said ball support.
    resilient means engage and support said sleeve with its upper end normally extending above said ball support member, said sleeve engaging a ball by the mold rind thereon, and
    a member is operatively carried by said ball engaging member to engage and move said sleeve downwardly before said ball engaging member engages a positioned ball.

5. Apparatus as in claim 1 further comprising:
    said support arm having concave recess on a side thereof for engaging a ball,
    said cutter means is adjustably positioned for axial movement at said recess for movement in a horizontal plane, the axis of said cutter means being at an angle of 45° with a radius of the ball at the point of contact, and
    micrometer means engage said cutter means to control the position thereof and the cutting action thereby.

6. Apparatus for trimming golf balls, or the like and including:
    a rotatable ball support member,
    a rotatable ball engaging member positionable directly above said ball support member,
    means for rotating said ball engaging members and moving it axially to and from engagement with a ball on said ball support member to clamp said ball against said ball support means,
    a pivotally positioned support means for said cutter means,
    control means operatively connecting to said support means to move said support means in a horizontal plane to bring said cutter means into and out of engagement with a ball clamped on said ball support member to trim mold flash from said ball, and
    connector means connecting said control means operatively to said support means for biasing said support means to urge said cutter means into engagement with a said ball to cut the mold rind therefrom, said connector means providing movement of said support means and cutter means away from a ball even though said control means are in a fixed position.

7. Apparatus as in claim 6 and where said ball support member has a concave support recess that engages less than half of a positioned ball,
   a vertically movable ball engaging sleeve encompasses said ball support member,
   resilient means support said sleeve with its upper end normally extending above said ball support member, said sleeve engaging a ball by the mold rind thereon, and
   a member is operatively associated with said ball engaging member moving means but which member is positioned for reciprocation only to engage and move said sleeve downwardly before said ball engaging member engages a positioned ball.

8. Apparatus as in claim 6 further comprising:
   said cutter means is adjustably positioned on said support means for movement in a horizontal direction, and
   micrometer means engage said cutter means to control the position thereof and the cutting action thereby.

9. Apparatus as in claim 6 further comprising:
   said control means include a power supply switch, an air cylinder, a solenoid, and a timer operatively connected together, said switch energizing said timer upon advance movement of said support means, said timer energizing said solenoid upon completion of a timing cycle, said solenoid controlling said air cylinder to return said support means when said solenoid is so energized.

10. Apparatus as in claim 9 where a grinder disc is movably positioned for movement to and from grinding engagement with the trimmed flash section of a ball,
    timer and control means operatively connect to said grinder disc to advance and retract it to and from engagement with a ball, and
    circuit means connect to said timer and control means to energize it and start it on an operative cycle by a signal generated by return of said support means to inoperative position.

11. Apparatus as in claim 1 further comprising a turntable journalled on said frame, and a plurality of ball support members positioned on circumferentially spaced portions of said turntable for movement therewith to be moved individually under said ball engaging member.

References Cited

UNITED STATES PATENTS

| | | | |
|---|---|---|---|
| 513,632 | 1/1894 | Conrader | 51—3 |
| 1,538,073 | 5/1925 | Vanderbeek | 51—99X |
| 1,993,363 | 3/1935 | Dreverhoff | 51—56X |
| 3,133,383 | 5/1964 | Chapman | 51—289X |

OTHELL M. SIMPSON, Primary Examiner

U.S. Cl. X.R.

51—99, 105